United States Patent
Wu et al.

(10) Patent No.: US 9,349,213 B2
(45) Date of Patent: May 24, 2016

(54) TILE-BASED ACCUMULATIVE MULTI-LAYER ALPHA BLENDING SYSTEMS AND METHODS

(71) Applicant: Vivante Corporation, Sunnyvale, CA (US)

(72) Inventors: Haomin Wu, Sunnyvale, CA (US); Frido Garritsen, Hayward, CA (US)

(73) Assignee: VIVANTE CORPORATION, Santa Clara, CA (US)

( * ) Notice: Subject to any disclaimer, the term of this patent is extended or adjusted under 35 U.S.C. 154(b) by 330 days.

(21) Appl. No.: 14/021,829

(22) Filed: Sep. 9, 2013

(65) Prior Publication Data

US 2015/0070393 A1 Mar. 12, 2015

(51) Int. Cl.
 *G06T 5/50* (2006.01)
 *G06T 15/50* (2011.01)

(52) U.S. Cl.
 CPC .................................... *G06T 15/503* (2013.01)

(58) Field of Classification Search
 CPC .................... G06T 15/503; G06T 5/50; G06T 2207/20221
 USPC ......................................................... 345/552
 See application file for complete search history.

(56) References Cited

U.S. PATENT DOCUMENTS

2014/0133748 A1* 5/2014 Wright .................... G06T 11/40
                                                            382/167
2015/0062154 A1* 3/2015 Ellis ...................... G06T 15/005
                                                            345/619

* cited by examiner

*Primary Examiner* — Gregory J Tryder
*Assistant Examiner* — Yuehan Wang
(74) *Attorney, Agent, or Firm* — David R. Stevens; Stevens Law Group

(57) ABSTRACT

A system for blending includes a memory device, cache, cache controller, and a graphics processing device. The graphics processing device performs blending of a plurality of source images into a single destination image. The graphics processing device performs a method including, for each tile position in the plurality of source images, requesting tiles for the tile position form each source image, blending the tiles individually with a destination tile and overwriting the destination tile in the cache with the result of the blending after each individual blending. The destination tile may be written to memory after each source tile for the each tile position has been blended with the destination tile, such as in response to a cache controller determining that the destination tile is a least recently used (LRU) entry in the cache.

5 Claims, 4 Drawing Sheets

US 9,349,213 B2

TILE-BASED ACCUMULATIVE MULTI-LAYER ALPHA BLENDING SYSTEMS AND METHODS

BACKGROUND

1. Field of the Invention

This invention relates to systems and methods for bandwidth optimization for multi-layer alpha blending composition.

2. Background of the Invention

In many graphics applications, one or more images may have alpha values associated with the pixels thereof, e.g. RGBα format. The alpha value indicates a translucence of the pixel. Accordingly, when rendering an image based on multiple overlaid images, the alpha values are used in a compositing step to determine a final pixel value.

When compositing multiple layers, prior composition engines will blend the first two layers and write a result to memory. The composition engine will read in another layer and read in the result of the previous blending step and blend them both. The result of this blending step is written to memory and the process is repeated for the next layer.

The systems and methods described herein provide an improved approach for compositing multiple images using a graphics processing system.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
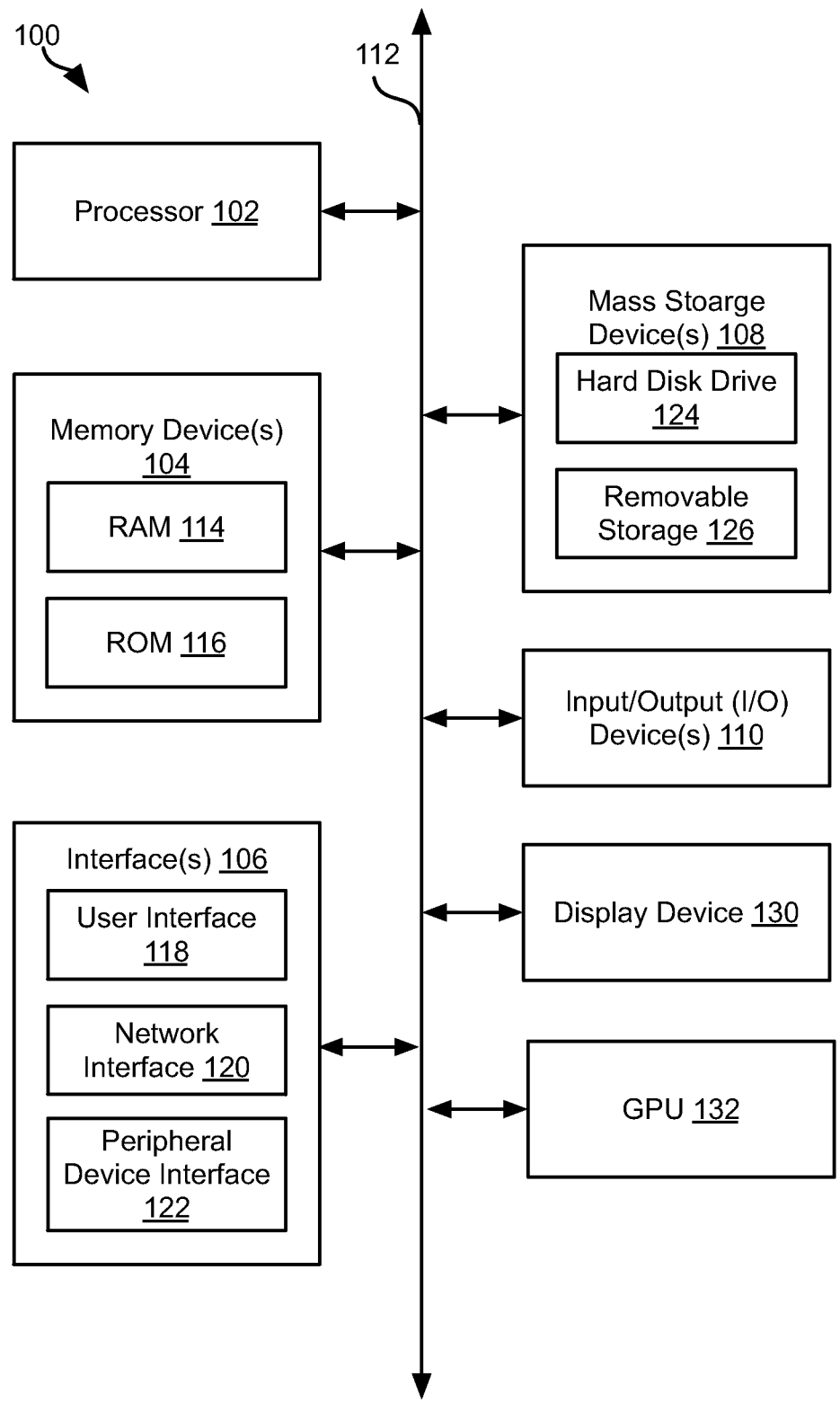
FIG. 1 is a schematic block diagram of a computer system suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. Accordingly, the invention has been developed to provide apparatus and methods for compositing multiple images. The images are divided into tiles sized to fit on a single cache line. The tiles at a given position for a plurality of sources are successively fetched and blended with a destination tile. Source tiles are overwritten as successive source tiles are fetched. The destination tile for a given tile position remains in the cache until all corresponding tiles of the plurality of sources have been blended therewith. The destination tile may then be written to memory due to a cache flush or it being overwritten as the least recently used (LRU) entry as a subsequent tile position is processed in the same manner.

The systems and methods disclosed herein advantageously reduce the amount of memory reads and writes by intelligently exploiting the functionality of a cache associated with a composition engine.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram illustrating an example computing device 100. Computing device 100 may be used to perform various procedures, such as those discussed herein. Computing device 100 can function as a server, a client, or any other computing entity. Computing device can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer readable media, such as magnetic tapes, magnetic disks, optical disks, solid-state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

A graphics processing unit (GPU) 132 may be coupled to the processor(s) 102, memory device(s) 104, and/or to the display device 130, such as by means of the bus 112. The GPU 132 may be operable to generate computer generated images and perform other graphical processing. The GPU 132 may include some or all of the functionality of a general purpose processor, such as the processor(s) 102. The GPU 132 may also include additional functionality specific to graphics processing. The GPU 132 may include hard-coded and/or hardwired graphics function related to coordinate transformation, shading, texturing, compositing, rasterization, and other functions helpful in rendering a computer generated image. In particular, the GPU 132 may perform some or all of the methods disclosed herein.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
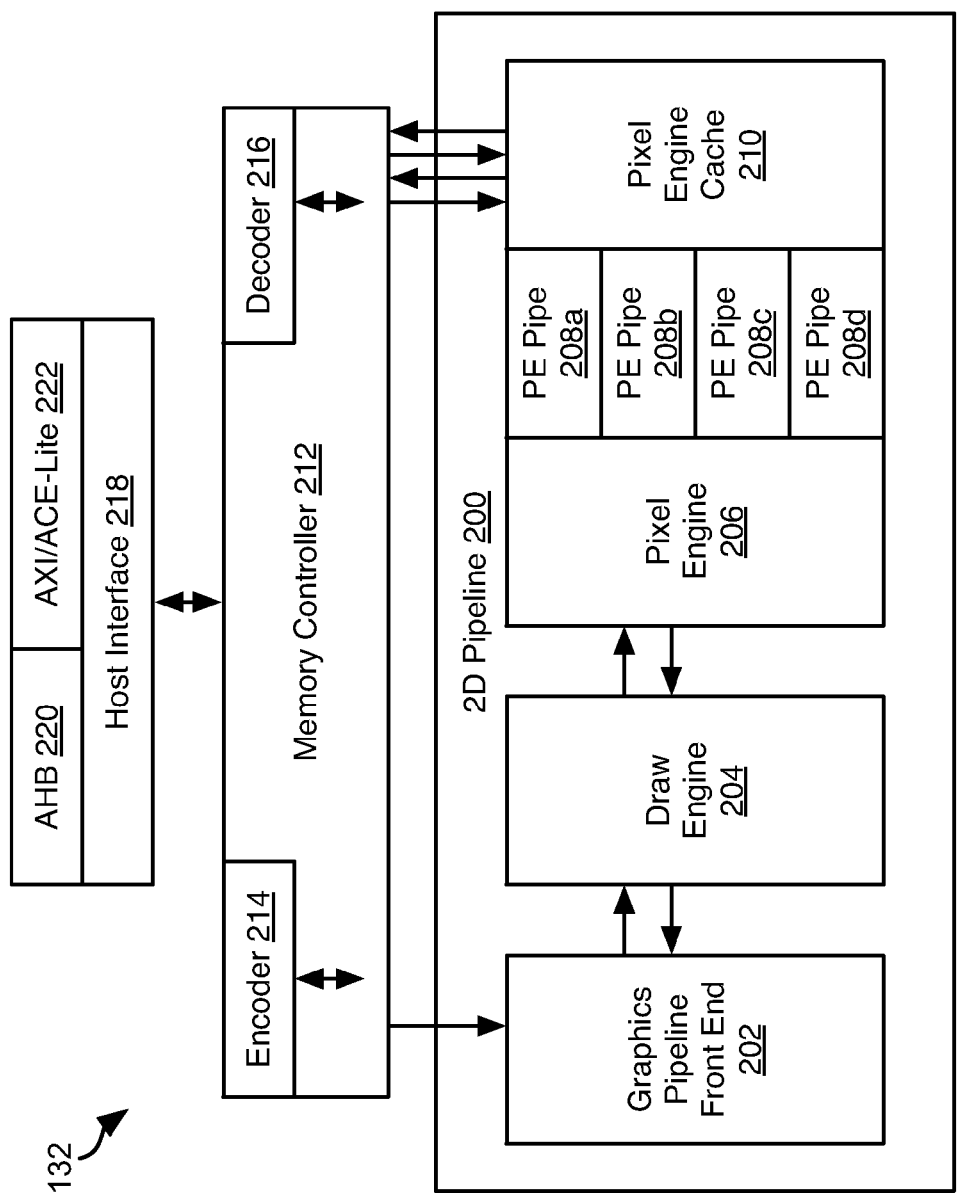
FIG. 2 is a schematic block diagram of components of a graphics processing system in accordance with an embodiment of the invention.

Referring to FIG. 2, a computing device, such as the computing device 100 may incorporate a graphics system 200 including some or all of the illustrated components along with any other components used for graphics processing known in the art.

The GPU 132 may include a two-dimensional graphics processing pipeline 200. The 2D pipeline 200 may perform such two-dimensional rendering tasks as blending, filtering, rotation, overlay, resizing, transparency, and other dynamic effects. The 2D pipeline 200 may include a graphics pipeline front end 202 that is operable to receive high-level instructions from a host system, a drawing engine 204 that is operable to interpret instructions and generate the pixel coordinates and attributes, and then input them to a pixel engine 206. The pixel engine 206 may then prefetch the pixels based on the addresses computed from the coordinates from the drawing engine 204 with respect to individual pixels. To facilitate the operation of the pixel engine 206 one or more pixel engine pipelines 208a-208d may facilitate the retrieval of data from a pixel engine cache 210 and/or the writing of results to the pixel engine cache 210. The pixel engine cache 210 may be operably coupled to a memory controller 212 in order to retrieve pixel data and write the results of operations to a memory, such as a memory device 104. Likewise, the graphics pipeline front end 202 may be operable to receive instructions by way of the memory controller 212.

In the illustrated embodiment, the memory controller 212 implements a compression codec. The compression codec compresses data written to the memory device 104 in order to reduce memory usage and traffic. Accordingly, the memory controller 212 may implement an encoder 214 for encoding data sent to the memory device 104 and a decoder 216 for decoding data received from the memory device 104.

In some embodiments, the memory controller 212 may interface with the memory device 104 by means of a host interface 218. The host interface 218 may implement one or more protocols for interacting with a processor 102 and/or memory device 104. For example, the host interface 218 may implement a direct memory access (DMA) interface such as an advanced microcontroller bus architecture (AMBA) High-performance Bus (AHB) interface 220. The host interface 218 may further implement an interface 222 for maintaining cache coherency such as an Advanced Extensible Interface (AXI) interface, AXI Coherency Extension (ACE), and/or ACE-Lite.

Figure 3:
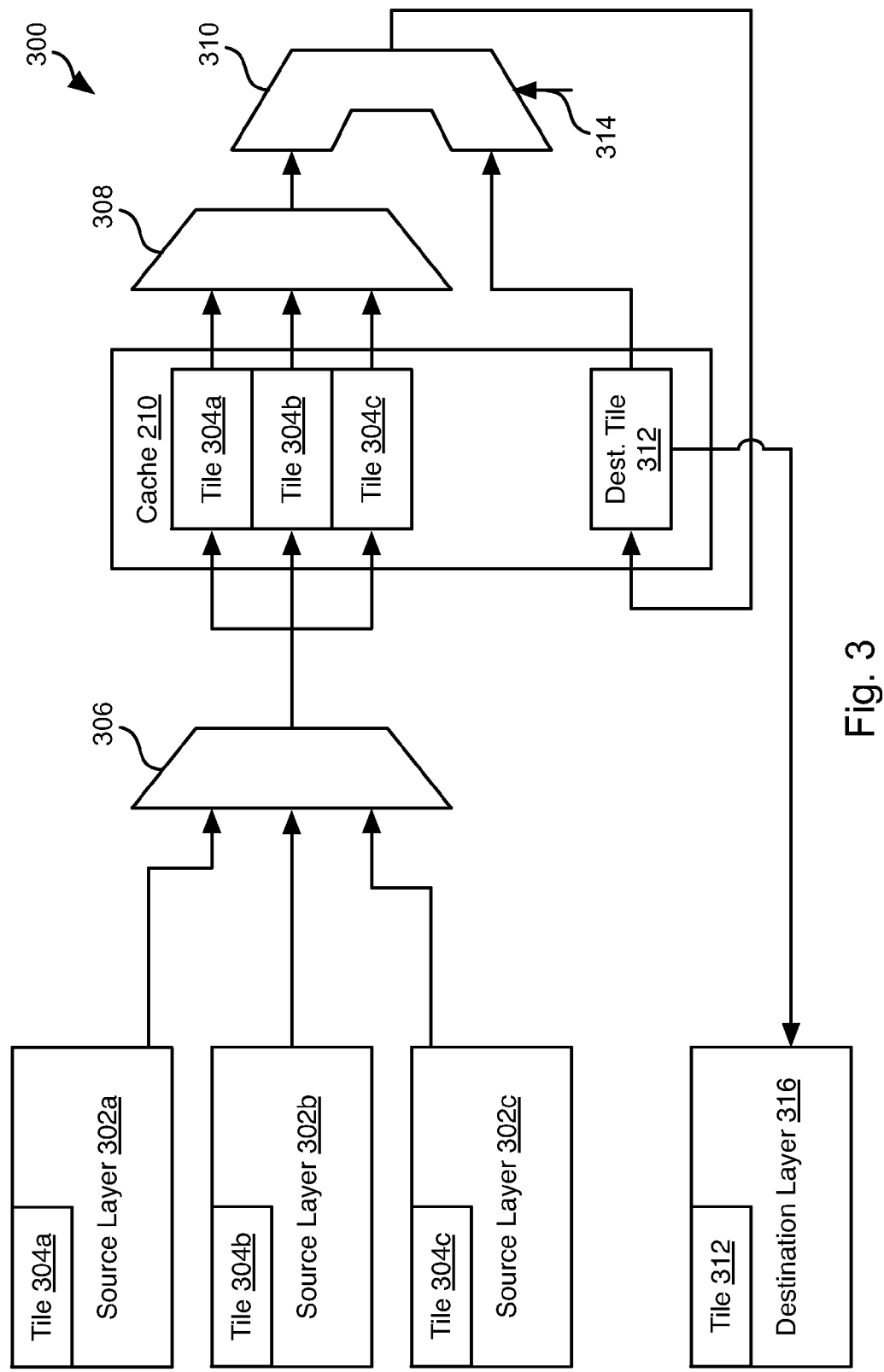
FIG. 3 is a process flow diagram of a method for compositing multiple images in accordance with an embodiment of the invention.

FIG. 3 illustrates a method 300 such as may be implemented using the GPU 132, 2D pipeline 200, general purpose processor 102, or some other processing device. The method 300 may be executed with respect to a plurality of source layers 302a-302c. The source layers may be any array of image data and preferably include data suitable for performing alpha blending, e.g. be in RGBα format. The source layers 302a-302c may be user interface elements, renderings of computer generated objects, or a graphical data representing any other entity. Each of the source layers 302a-302c may be composed of, or divisible into, tiles 304a-304b. In some embodiments, each tile 304a-304c of each source layer 302a-302c may have a corresponding tile 304a-304c in each other source layer. That is to say, for a given position in a final composited image, each source layer 302a-302c may contribute a tile corresponding to that position.

As shown by the multiplexer 306, a tile for a given tile position may be successively, e.g. in sequence, read into a cache, such as the cache 210. As shown by multiplexer 308, the tiles for a given tile position may be successively input to a blending module 310 that takes as another input the value a destination tile 312 corresponding to the given tile position and likewise stored in the cache 210. After a tile 304a-304c for a given source layer 302a-302c is blended with the destination tile 312 the result may be written back to the cache 210, e.g. overwrite the previous destination tile 312. The blending module 310 may further take as an input a blending mode input 314 that specifies a blending mode with which a given source tile 304a-304c and the destination tile 312 for a given tile position are to be blended. For example, the Porter-Duff alpha blending algorithm may be used.

Once each tile 304a-304c at a given tile position for each source layer 302a-302c have been processed by the blending module 310, the final version of the destination tile 312 may be written to a destination layer 316.

In the method 300, the source layers 302a-302c and destination layer 316 may be stored in a memory device 104a. As shown in FIG. 3 it is apparent that the destination tile is only written out to the memory device once regardless of the number of source layers 302a-302c. In some embodiments, this is achieved due to the functionality of a cache controller. Specifically, the destination tile 312 stored in the cache 210 is updated as each tile 304a-304c for the given tile position is processed. Accordingly, the destination tile 312 will not be the least recently used (LRU) entry in the cache. As source tiles 304a-304c corresponding to a given tile position are read into the cache 210, they will overwrite other cache entries (e.g. previously processed source tiles 304a-304c) rather than the destination tile 312. After all of the tiles 304a-304c for a given tile position have been processed, the destination tile 312 stored in the cache 210 for that tile position will no longer be changed or otherwise used. Accordingly, the destination tile 312 will be written out to the destination layer 316 stored in a memory device 104 when it is overwritten as the LRU entity due to reading in of source tiles for a different tile position into a cache 210, writing of a destination tile for a different tile position to the cache 210, flushing of the cache 210, or some other event.

Figure 4:
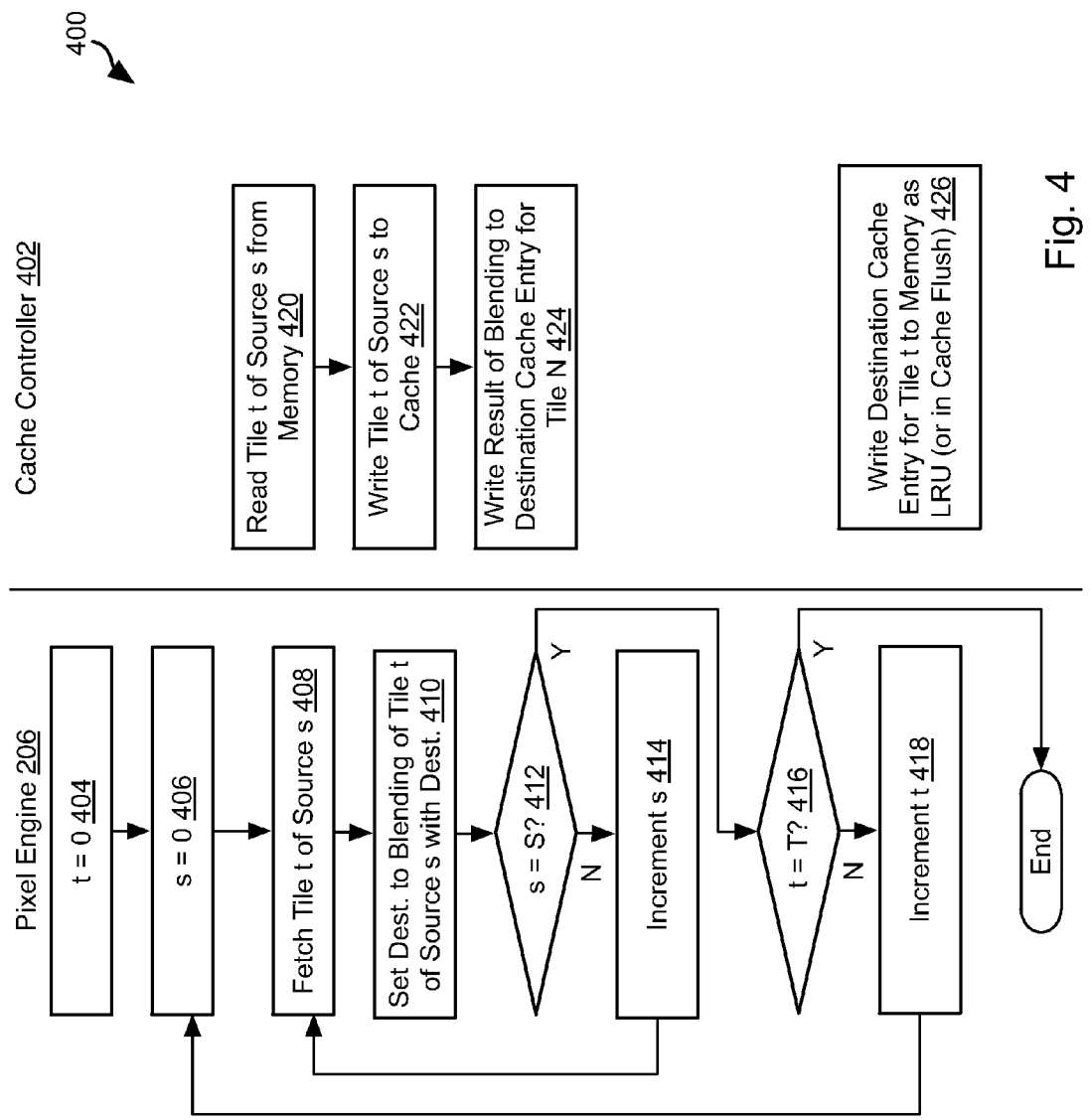
FIG. 4 is an alternate process flow diagram representing the method for compositing multiple images in accordance with an embodiment of the invention.

FIG. 4 provides an alternative method 400 for compositing multiple source layers. The method 400 may be executed with respect to a set of source images, herein represented by indexes s=1 to S, where S is the total number of source images. Each image may define a tile at a given position. Each tile position may be represented herein by an index t=1 to T, where T is the total number of tiles in each source image. As noted above, each source image s may define tiles t=1 to T corresponding to each tile position, such that tile 1 of source 1 has the same relative location in source 1 as tile 1 has in source 2, tile 2 of source 1 has the same position in source 1 as tile 2 has in source 2, and so on.

The method 400 may begin with tile t=0 and source s=0 as shown at steps 404 and 406. Of course any other starting point or representations of tiles and source images may be used.

The method 400 may include fetching 408 tile t of source s, for the current values of t and s. Fetching 408 may include requesting tile t of source s from a memory device 104. The method 400 may be executed in a pipelined fashion such that the fetching step for tile t of source s occurs while tile t of source s-p, where p is some integer according to the method 400 is still ongoing. Likewise, pipelined execution may cause tile t of source s to be fetched 408 while tile t-k of source s-p, where either of k and p are positive integers.

The method 400 may further include setting 410 a destination tile d(t) corresponding to the current value of t equal to a result of blending the tile t of source s with the current value of d(t). Setting 410 the destination tile d(t) may therefore include performing a blending algorithm with respect to tile t of source s and the current value of destination tile d(t). The blending algorithm may include any blending algorithm, such as the Porter-Duff alpha blending algorithm.

The method 400 may include evaluating 412 whether s=S, e.g. the last source image has been processed. If not, then the value of s may be incremented 414 or otherwise modified to refer to a next source image and processing may continue at step 408. If s is found to be equal to S at step 412, the method 400 may include evaluating 416 whether t=T, e.g. each tile position has been processed. If not, then the value of t is incremented or otherwise modified to reference a next tile position, and processing continues at step 406. If each tile position is found 416 to have been processed, then the method 400 may end with respect to a given set of source images s=1 to S.

As shown in FIG. 4, the method 400 as executed by a 2D pipeline 200 may be executed in parallel with operation of a cache controller 402. The cache controller 402 may be implemented by the pixel engine cache 210 or some other component. For example, fetching 408 of tile t of source s may invoke the cache controller 402 to perform some or all of reading 420 tile t of source s from a memory device and writing 422 tile t of source s to a cache, such as a cache 210. The blending performed at step 410 may therefore be performed by retrieving the version of tile t of source s from the cache 210. The cache controller 402 may further write 424 a result of blending performed at step 410 to a cache line corresponding to the destination tile d(t), e.g. without actually writing the destination tile d(t) to the memory device 104.

The cache controller 402 may perform steps 420-424 in response to read and write instructions referencing address locations in memory. For example, writing the result of the blending step 410 to the cache may be in response to intercepting an instruction to write the resulting d(t) to a corresponding memory location in memory device 104 for the tile t in the destination layer. Likewise, reading 420 and writing 422 of the source tile may be performed by the cache controller 402 in response to a request to read a memory location of tile t of source s from the memory device 104.

The cache controller 402 may additionally perform a step of writing 426 a destination tile d(t) to a memory device 104a, e.g. a location corresponding to tile t in the destination layer in the memory device 104a. Writing 426 of the destination tile d(t) from the cache may be in response to the cache controller 402 determining that the destination tile d(t) is a least recently used (LRU) entry and overwriting it with other data, such as for source tile or destination tile for a different value of t. Writing 426 the destination tile d(t) may also be in response to the cache controller 402 performing a cache flush or some other triggering event.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A system for blending, the system comprising:
   a memory device storing a plurality of source images defining tiles at a plurality of tile positions;
   a cache;
   a cache coherency controller;
   a graphics processing device configured to perform a method including:
      for each tile position, by means of a graphics processing system—
         successively requesting from the memory device tiles corresponding to the each tile position in the plurality of source images;
         receive the tiles corresponding to the each tile position in the plurality of source images;
         successively individually blending the tiles corresponding to the each tile position in the plurality of source images with a destination tile corresponding to the each tile position; and
         successively generating instructions to the memory device to overwrite the destination tile corresponding to the each tile position with results of the successive individual blending;
   wherein the cache coherency controller is configured to:
      store the tiles corresponding to the each tile position in the cache;
      intercept the instructions to the memory device to overwrite the destination tile corresponding to the each tile position with the results of the successive individual blending; and
      update in the cache a cache entry corresponding to the destination tile corresponding to the each tile position without transmitting the results of the successive individual blending to the memory device until after the successive individual blendings for the each tile position are completed;
   wherein the cache defines a cache line size and has a size greater than or equal to twice the cache line size, the tiles of the plurality of images are equal to the cache line size.

2. The system of claim 1, wherein the cache controller is further configured to invoke writing of the cache entry corresponding to the destination tile corresponding to the each tile position after the successive individual blendings for the each tile position are completed.

3. The system of claim 2, wherein the cache controller is further configured to invoke writing of the cache entry corresponding to the destination tile corresponding to the each tile position in response to overwriting of the cache entry with a tile of a source image of the plurality of source images.

4. The system of claim 2, wherein the cache controller is further configured to invoke writing of the cache entry corresponding to the destination tile corresponding to the each tile position in response to determining, by the cache controller, that the cache entry is a least recently used cache entry.

5. The system of claim 1, wherein the graphics processing device is a two-dimensional composition engine.

* * * * *